United States Patent Office 2,971,800
Patented Feb. 14, 1961

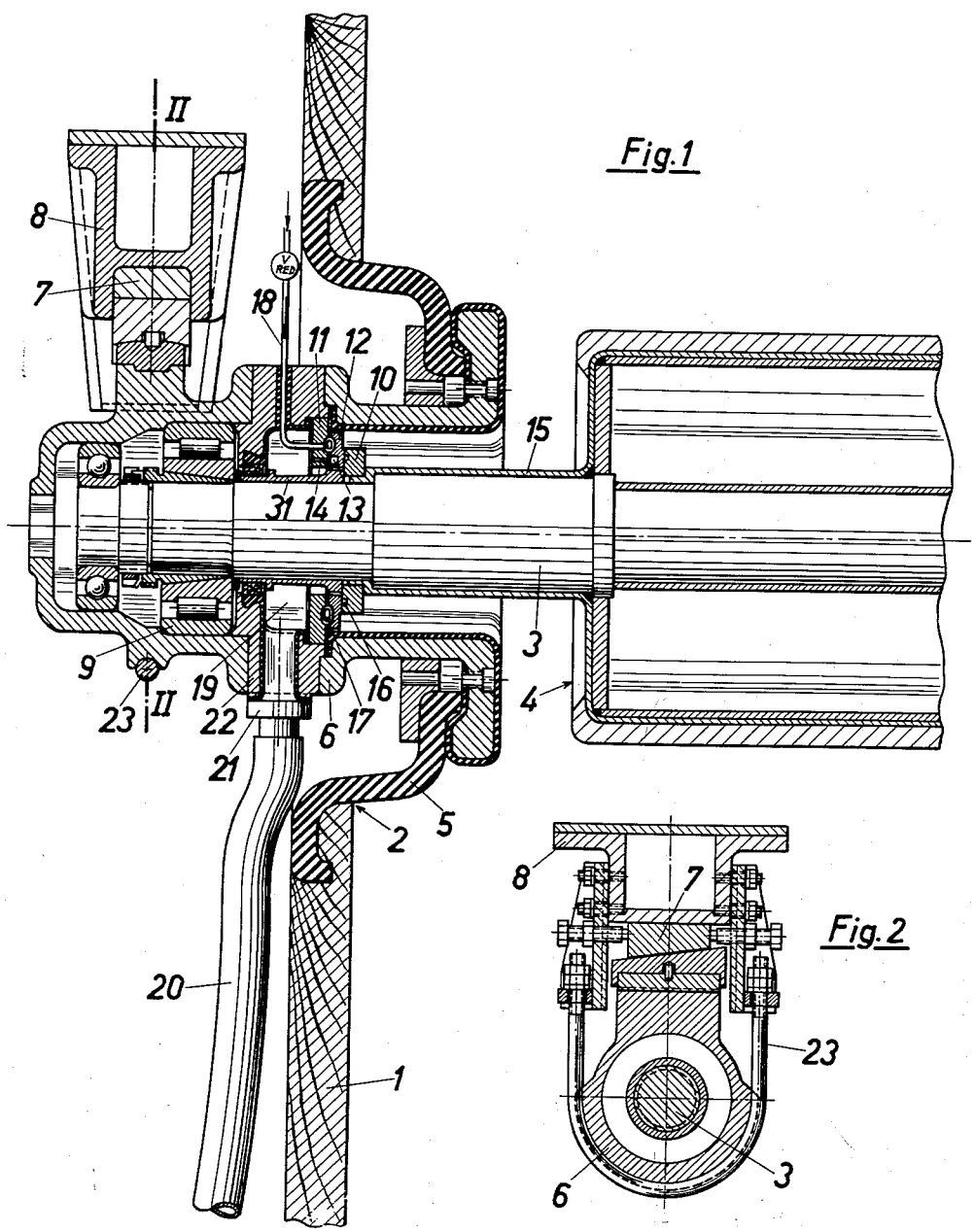

2,971,800

MEANS FOR SEALING AND ROTATABLY MOUNTING A ROTARY SHAFT IN A LIQUID-FILLED CONTAINER

Othmar Ruthner, 6 Salmgasse, Vienna III, Austria

Filed Oct. 21, 1958, Ser. No. 768,750

Claims priority, application Austria Oct. 23, 1957

13 Claims. (Cl. 308—36.1)

This invention relates to means for sealing a rotary shaft in a liquid container, particularly in one which contains acids and which in this use is particularly suitable for strip metal tinning plants. In these installations the means according to the invention enables the shaft which carries the reversing roller to be located in the position which provides for a satisfactory movement of the strip without need for moving the container.

In the known plants for the tinning of continuously moving strip metal, the latter is repeatedly moved through electrolyte-filled tanks. The strip is alternately guided on current-supplying rollers disposed outside the tanks and on reversing rollers disposed in the electrolyte. In the known constructions a difficulty resides in the bearing arrangement for the reversing rollers. As the bearings were exposed to the action of the electrolyte it was necessary to make them from special, corrosion-resisting materials, which involved high costs. These disadvantages are eliminated by the present invention.

It is a feature of the invention that the rotary shaft extends out of the liquid container, which comprises at the bearing points for the shaft a wall portion which consists of a diaphragm and has an aperture in which the bearing housing carrying the shaft end is inserted, said bearing housing being vertically adjustably connected to a rigid frame carrying it, which frame is disposed outside the container, a set of cooperating slip rings being provided which extend at right angles to the shaft axis and contact each other at their end faces to seal the interior of the container from the bearing space, the inner slip ring facing the interior of the container being affixed to the shaft and the outer slip ring facing the bearing space being affixed in the housing.

Another feature of the invention resides in that three slip rings are provided, one of which is tightly connected to the shaft whereas the other two are carried by the housing.

It is also a feature of the invention that one of the stationary slip rings is clamped fast in the housing and the other is axially displaceable relative to the first, a ring variable in thickness being provided between these two slip rings.

Finally, it is a feature of the invention to provide between the two stationary slip rings an annular tube which is connected to a pressure fluid source.

Additional features of the invention will be explained with reference to the drawing, which shows an embodiment of the means according to the invention. Fig. 1 is an axial longitudinal sectional view showing the means and Fig. 2 a sectional view taken on line II—II of Fig. 1 in a reduced scale.

For the sake of simplicity only a part of the tank wall 1 is shown, which is formed with an aperture 2, through which the rotary shaft 3 extends, which carries the reversing roller 4, only a broken-away portion of which is shown. A rubber diaphragm 5 is affixed to the rim of the aperture 2 and carries the housing 6 for rotatably mounting the shaft end. The diaphragm 5 enables the movement of the shaft 3 in all directions without need for any change in the position of the tank.

The housing 6 is carried by a rigid frame 8, which lies outside the tank 1 and is affixed to this tank or to another stationary structure. The connection between the housing 6 and the frame 8 is effected with a wedge 7, which is tapered at least on one surface, which bears on a mating surface of the housing 6 or of the frame 8. The wedge 7 is arranged to be adjustable at right angles to the plane of the drawing and is held by fastenings 23 to the housing 6 and the frame 8. It is a sliding wedge and can be displaced in one direction or the other to cause the housing 6 to approach the frame 8 or to be moved away from it.

The rotary shaft is rotatably mounted in the bearing 9, which is carried by the housing 6 and which is sealed from the interior of the liquid container by means of three slip rings 10, 11, 12, which seal the rotary shaft. As the tanks are filled in most cases with corrosive liquid, the slip rings serving at the same time as sealing rings and supporting rings are made from carbon. This material is selected because the rings are subjected in operation not only to corrosive influence but also to high temperatures, e.g., at 90° C., for which only carbon is suitable. Of the slip rings 10, 11, 12 the one denoted 11 is clamped fast in the housing 6 and carries the slip ring 12, which is axially slidable and for this purpose carries centering pins 13, which are mounted in registering bores 14 of the ring 11. The slip ring 10 is tightly mounted on the sleeve 15 of corrosion-resisting material, which surrounds the shaft 3. The slip ring 10 is clamped fast in its axial position by the bearing 9 carrying the shaft 3 and by clamping sleeves 31. The ring 10 follows the rotation of the sleeve 15 and has a labyrinth seal 16 at its end face facing the slip ring 12. The slip ring 12 serves for compensating the wear and assembly tolerances. To ensure that the slip ring 12 is appropriately urged against the sliding face of the ring 10, an annular rubber tube 17 is provided between the rings 11, 12 and is connected to a compressed air system by the hose 18, which may preferably also consist of rubber. A reducing valve, not shown, may be employed to adjust in the annular tube 17 a pressure which is sufficient to compensate the counterpressure acting from the tank on the ring 12 so that the friction forces which are effective between the sliding face of the ring 12 and the sliding face of the ring 10 are very small. The slight contact pressure is sufficient to ensure a perfect seal preventing a leakage of liquid from the container. The small contact pressure ensures at the same time an almost unbraked motion of the roller 4 in conjunction with a perfect seal. The annular tube 17 enables the adjustment of favorable force relations and perfectly seals the gap between the rings 11, 12. Any liquid which has leaked out in operation is collected in the space 19 and may be returned into the main tank by an appropriate conduit 20 so that losses of valuable electrolyte, such as tin electrolyte, are avoided. To enable a check whether a slip ring still seals perfectly, a transparent hose 20, e.g., of the plastic tubing sold under the trade name Mipolam, is connected by means of a flange 21 to the collecting housing 22 so that the operator can immediately recognize whether liquid leaks through one of the seals.

The housing 6 and the collecting housing 22 consist of cast iron and are provided with a rubber layer on the inside for protection against corrosion. The roller 4 is made of steel and also provided with a layer, e.g., of rubber, for protection against corrosion.

The carbon rings are insulated against ground to prevent a flow of current.

The means according to the invention permits of a light construction of the tank so that the same can easily be displaced. Besides, the bearings for the shaft 3 may be made of a special material for high duty without need to provide for resistance to corrosion.

Materials other than rubber, such as plastics, may be used for the diaphragm 5.

The diaphragm 5 is connected by any desired means to the bearing housing 6. It is sufficient if the joint is tight so there is no leakage of liquid out of the tank 1 at the joint. The diaphragm 5 is suitably detachably connected to the tank wall; for the reason mentioned above this joint should also be tight. The aperture 2 is of sufficient size to permit the shaft 3 and the reversing roller 4 to be guided out of the tank 1 through the aperture 2.

I claim:

1. Means for sealing and rotatably mounting a rotary shaft in a liquid-filled container, comprising a container wall portion defining an aperture, a bearing housing inserted in the aperture, a diaphragm disposed between and connected to the housing and the wall portion defining the aperture to constitute a portion of the seal, a stationary rigid frame, a rotary shaft, said bearing housing carrying one end of the shaft and being vertically adjustably connected to the rigid frame, said frame being disposed on the exterior side of the wall portion, a set of cooperating slip rings in the bearing housing and extending at right angles to the shaft axis and contacting each other along their faces to complete the seal on the interior side of the container wall portion, one slip ring facing the interior of the said liquid-filled container being fixed to the shaft and another slip ring facing the bearing housing being stationary in the housing.

2. Means as set forth in claim 1, in which the housing is of cast iron and has a corrosion-resisting coating on its surface exposed to the interior side of the container wall portion.

3. Means as set forth in claim 2, in which the coating of the housing consists of rubber.

4. Means as set forth in claim 1, in which there are two stationary slip rings and one of the stationary slip rings is clamped fast in the housing and the other one is axially displaceable relative to the first, and a ring of variable thickness is provided between these two stationary slip rings.

5. Means as set forth in claim 4, in which one of the stationary slip rings carries centering pins which extend into registering bores of the other slip ring.

6. Means as set forth in claim 4, in which an annular tube connected to a pressure fluid source is provided between the two stationary slip rings.

7. Means as set forth in claim 6, in which compressed air is used as a pressure fluid.

8. Means as set forth in claim 6, comprising a supply conduit leading to the annular tube, and a reducing valve provided in the supply conduit.

9. Means as set forth in claim 1, in which a collecting space is defined in the housing on the exterior side of the slip rings and which serves for collecting any liquid which has leaked through the rings.

10. Means as set forth in claim 9, comprising a conduit leading back to the main container from the collecting space.

11. Means as set forth in claim 9, in which a transparent hose is connected to the collecting space.

12. Means as set forth in claim 1 comprising a reversing roller connected to the shaft on the interior side of the wall portion, the container wall portion aperture covered by the diaphragm being larger than the diameter of the shaft and reversing roller.

13. Means as set forth in claim 1 comprising a slidable wedge connecting the housing to the frame which carries said housing.

References Cited in the file of this patent

UNITED STATES PATENTS

| | | |
|---|---|---|
| 1,798,596 | Fahrney | Mar. 31, 1931 |
| 2,015,233 | Pfleger | Sept. 24, 1935 |
| 2,272,029 | Benson | Feb. 3, 1942 |